(12) United States Patent
Bao et al.

(10) Patent No.: US 8,960,325 B2
(45) Date of Patent: Feb. 24, 2015

(54) FREE-MASS AND INTERFACE CONFIGURATIONS OF HAMMERING MECHANISMS

(75) Inventors: Xiaoqi Bao, San Gabriel, CA (US); Stewart Sherrit, La Crescenta, CA (US); Mircea Badescu, La Canada Flintridge, CA (US); Yoseph Bar-Cohen, Seal Beach, CA (US); Steve Askins, Madrid (ES); Patrick Ostlund, Pomona, CA (US)

(73) Assignee: California Institute of Technology, Pasadena, CA (US)

( * ) Notice: Subject to any disclaimer, the term of this patent is extended or adjusted under 35 U.S.C. 154(b) by 643 days.

(21) Appl. No.: 13/282,660

(22) Filed: Oct. 27, 2011

(65) Prior Publication Data
US 2012/0037390 A1 Feb. 16, 2012

Related U.S. Application Data

(63) Continuation-in-part of application No. 12/877,390, filed on Sep. 8, 2010, now Pat. No. 8,657,027.

(60) Provisional application No. 61/240,569, filed on Sep. 8, 2009, provisional application No. 61/407,159, filed on Oct. 27, 2010.

(51) Int. Cl.
*E21B 1/02* (2006.01)
*B23B 37/00* (2006.01)
*E21B 25/00* (2006.01)

(52) U.S. Cl.
CPC . *E21B 1/02* (2013.01); *B23B 37/00* (2013.01); *E21B 25/00* (2013.01); *B23B 2260/108* (2013.01)
USPC ......... 173/90; 173/171; 310/311; 310/323.19

(58) Field of Classification Search
CPC .. B23B 2260/108; B23B 37/00; B23B 45/00; B23B 45/16; E21B 1/02; E21B 25/00
USPC ........... 173/91, 102, 103, 112, 122, 221, 166, 173/171, 131, 90; 310/323.18, 323.19, 311; 175/55, 56
See application file for complete search history.

(56) References Cited

U.S. PATENT DOCUMENTS 7,156,189 B1 * 1/2007 Bar-Cohen et al. ............. 173/91

* cited by examiner

*Primary Examiner* — Michelle Lopez
(74) *Attorney, Agent, or Firm* — Milstein Zhang & Wu LLC; Joseph B. Milstein

(57) ABSTRACT

The design of the free-mass in an ultrasonic driller/corer (USDC) has been refined in order to improve the performance and operational reliability of the system. In one embodiment, the improvements in performance and operational reliability include decreasing the impact surface area of the free-mass to increase the transfer of impact energy from the piezoelectric transducer and reductions in the likelihood that the system will jam.

14 Claims, 14 Drawing Sheets

FREE-MASS AND INTERFACE CONFIGURATIONS OF HAMMERING MECHANISMS

CROSS-REFERENCE TO RELATED APPLICATIONS

This application claims priority to and the benefit of U.S. provisional patent application Ser. No. 61/407,159 filed Oct. 27, 2010 and this application is also a continuation-in-part of U.S. patent application Ser. No. 12/877,390 filed Sep. 8, 2010, issued as U.S. Pat. No. 8,657,027 on Feb. 25, 2014, which application claimed priority to and the benefit of then U.S. provisional patent application Ser. No. 61/240,569 filed Sep. 8, 2009. This application is related to U.S. patent application Ser. No. 11/700,575 filed Jan. 31, 2007. Each of the applications referenced above is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

FIELD OF THE INVENTION

The invention relates to ultrasonic driller/corers in general and particularly to ultrasonic driller/corers that employ free-masses.

BACKGROUND OF THE INVENTION

A variety of industrial applications exist where power ultrasonic actuators are used to produce large amplitude vibrations. These applications include medical/surgical, automotive, food preparation space applications and textile cutting applications, as well as use in fabrication industries and material joining. Ultrasonic actuators are attractive for their ability to generate precision high strokes, torques and forces while operating under relatively harsh conditions, such as temperatures in the range of single digit Kelvin to 1273 Kelvin.

NASA in-situ exploration missions, such as the Phoenix and MSL missions, are increasingly requiring analysis of acquired samples to detect and characterize the presence of potential biomarkers of life and water, as well as determine the geological properties. For these missions, there is a need to produce samples using effective mechanisms. Samplers based on the ultrasonic/sonic percussive mechanism, also known as ultrasconic driller/corers (USDCs), have shown promise in support of such missions. In part the USDC has utility for space applications because it requires low axial preload on the bit, allowing drilling from low-mass platforms.

The free-mass is an element in the activation of the ultrasonic/sonic percussive mechanism. It performs frequency reduction from the ultrasonic (or high frequency) vibration produced by the piezoelectric actuators to the sonic (or low frequency) vibration required for effective drilling. In some USDC designs, the frequency is reduced from about 20 kHz to about 60-1,000 Hz. The free-mass is placed in between the horn and the bit and is free to move axially between the horn and the bit. FIG. 1 shows a prior art design of a free-mass which has a cylindrical geometry with a center hole. This design has at least the problem that the free-mass tends to jam. This results in the termination of operation of the USDC. In addition once jammed, the system is difficult to disassemble.

There is a need for an USDC that address the operational limitations of the prior art, including the tendency of these systems to jam, so as to improve the performance and operational reliability of drillers and corers that are driven by a ultrasonic/sonic percussive mechanism.

SUMMARY OF THE INVENTION

According to one aspect, an ultrasonic percussive drilling/coring system comprises a horn portion configured to receive ultrasonic energy from an actuator material, the actuator material configured to receive power from a power supply, a bit portion in mechanical communication with the horn portion, and a free-mass portion situated between the horn portion and the bit portion and capable of moving from a position of contact with one of the horn portion and the bit portion to a position of contact with the other of the horn portion and the bit portion, the free-mass portion having a geometry configured to receive momentum from the horn portion and to transmit momentum to the bit portion without exceeding stress and material deformation parameters of the bit portion, the free-mass portion or the horn portion.

In one embodiment, the geometry of the free-mass portion is configured to reduce jamming of the free-mass portion as it moves from a position of contact with one of the horn portion and the bit portion to a position of contact with the other of the horn portion and the bit portion. In another embodiment, the geometry of the free-mass portion has a toroidal shape. In an additional embodiment, a contact profile when the free-mass portion is in the position of contact with one of the horn portion and the bit portion is chosen from the group consisting of a point contact, a circular contact, a line contact, a ring contact, a dashed line contact, a dashed ring contact, and combinations thereof. In a further embodiment, the contact profile for the free-mass for the horn portion is different from the contact profile for the free-mass for the bit portion. In yet another embodiment, the free-mass portion is configured to maximize a stress amplitude at at least one of a first interface between said horn portion and said free-mass portion and a second interface between said free-mass portion and said bit portion without exceeding stress and material deformation parameters of said bit portion, said free-mass portion or said horn portion. In yet an additional embodiment, the free-mass portion has a material property chosen from at least one of a stiffness, a hardness, and a density. In yet a further embodiment, the free-mass portion has a mass configured to receive momentum from the horn portion and to transmit momentum to the bit portion without exceeding stress and material deformation parameters of the bit portion, the free-mass portion or the horn portion. In still another embodiment, the geometry of the free-mass portion is configurable to control a resonant frequency of the free-mass. In still an additional embodiment, the geometry of the free-mass portion is configurable to maximize impact momentum transferred from the horn portion to the bit portion. In still a further embodiment, the geometry of the free-mass portion is configurable to minimize the jamming of the free-mass portion. In still a further embodiment, the free-mass portion has a thickness configured to receive momentum from the horn portion and to transmit momentum to the bit portion without exceeding stress and material deformation parameters of the bit portion, the free-mass portion or the horn portion. In yet still another embodiment, the free-mass portion has a first resonant frequency, the horn portion has a second resonant frequency, and the bit portion has a third resonant frequency, the first resonant frequency being different from the second resonant frequency and the third resonant frequency. In yet still an additional embodiment the free-mass is constrained in a transverse direction and is free to move in an axial direction.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

According to the principles of the present invention, the design of the free-mass in an ultrasonic driller/corer (USDC) has been refined in order to improve the performance and operational reliability of the system. In one embodiment, the improvements in performance and operational reliability include decreasing the impact surface area of the free-mass to increase the transfer of impact energy from the piezoelectric transducer and shaping the free-mass to reduce the likelihood that the system will jam.

The operation of a USDC includes an actuation material, such as a piezoelectric or electrostrictive material, that is mechanically coupled to an ultrasonic horn. The ultrasonic horn receives ultrasonic vibrational energy and amplifies or otherwise modifies the energy, for example by focusing the energy at a particular location and/or by imparting directionality to the forces that the actuation material provides (for example, by converting linear motion to rotational motion). The performance characteristics of the horn are determined in part by its geometrical design and its material properties. In USDCs that embody the current invention, energy from the horn is passed to a free-mass which in turn passes the energy to a bit. In passing the energy, the free-mass performs a frequency reduction from the ultrasonic vibrations produced by the piezoelectric actuators to the sonic vibrations required for effective drilling.

In normal operation, the free-mass bounces between the horn and the bit, impacting both repeatedly. The impact stress profile, maximum stress, contact time duration, and, as a consequence, the required yielding stress for the materials of the free-mass, bit and horn are all affected by the contact area. For example reducing the contact time increases the applied force during the momentum transfer associated with the impact. In addition a larger contact area results in lower stress in the contact region and avoids yielding or permanent deformation of the materials. However, before the excitation voltage is applied to the transducer the horn, the free-mass and the bit are pressed together. A larger contact area results in a stronger coupling of the bit to the horn transducer. A strong coupling changes the vibrational characteristics of the transducer and makes the USDC harder to start. According to the principles of the invention, free-masses have been designed to balance the operational characteristics required for a particular application or embodiment. According to the invention, different designs are employed to address the conflicting contact area requirements. In some embodiments, the geometry of the free-mass is configured to maximize the impact momentum transferred from the horn to the bit by the free-mass without exceeding the stress and material deformation parameters of the bit, the free-mass and the horn.

Figure 1:
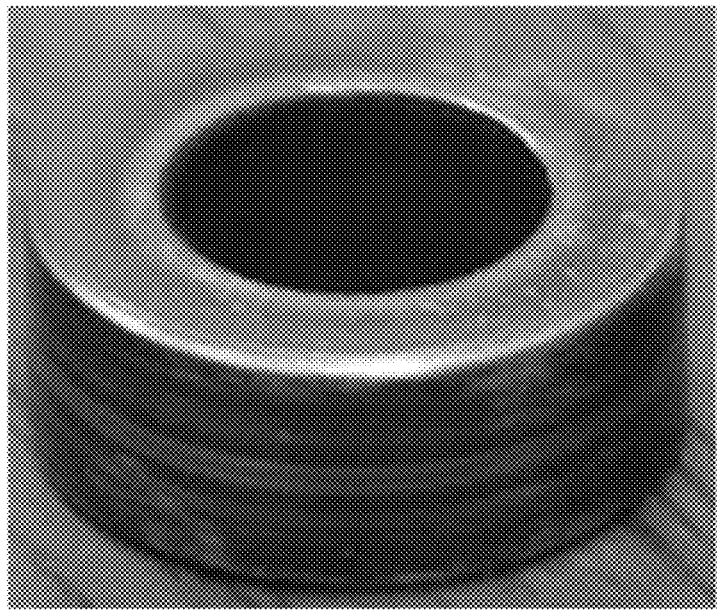
FIG. 1 shows a design of a free-mass that has a cylindrical geometry with a center hole known in the prior art.
Figure 2A:
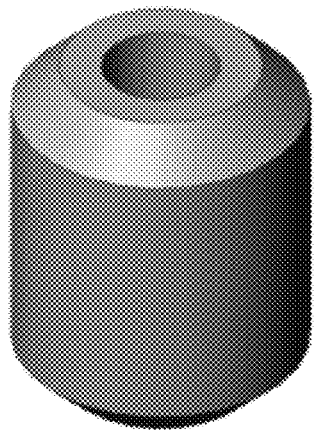
FIG. 2A shows a three-dimensional rendering of one embodiment of a free-mass employing a chamfer.
Figure 2B:
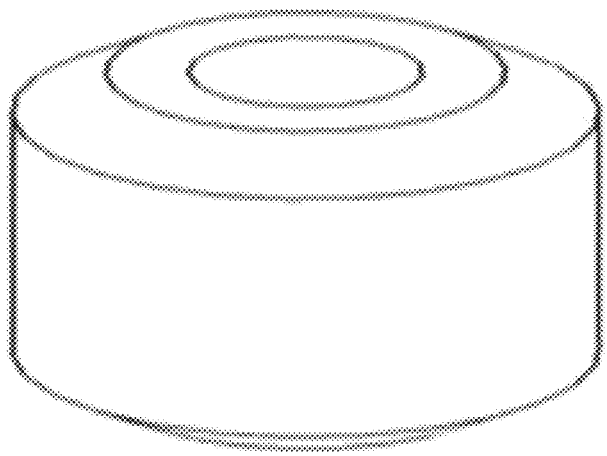
FIG. 2B shows a perspective line drawing of one embodiment of a free-mass employing a chamfer.
Figure 3A:
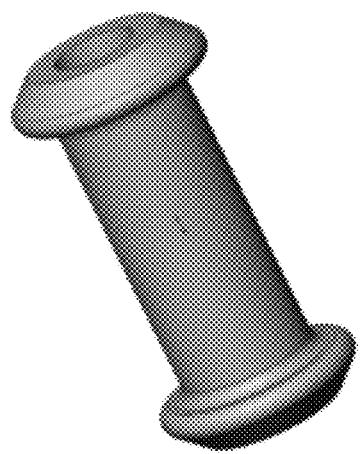
FIG. 3A shows a three-dimensional rendering of one embodiment of a free-mass employing a chamfer.
Figure 3B:
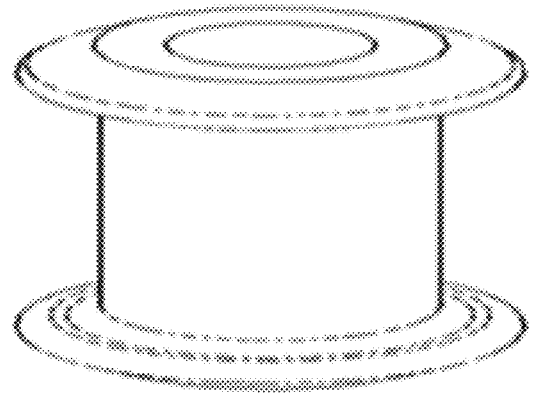
FIG. 3B shows a perspective line drawing of one embodiment of a free-mass employing a chamfer.

As part of determining the design parameters of free-mass configurations according to the invention, tests were made on various embodiments including ones with free-masses having weights from 1 g to 8 g, in increments of 0.5 g up to 4 g, and in 1 g up to 8 g. In one embodiment, multiple 5-32 nuts were used as the free-mass. In some embodiments, sharp edges on the free-mass configurations were avoided as these may dig into the inside diameter of the drill bit as the free-mass travels up and down. In some embodiments, a 0.050 inch chamfer was made around the edges. FIGS. 2A and 2B show, respectively, a three-dimensional rendering and a perspective line drawing of one embodiment employing a chamfer. FIGS. 3A and 3B show, respectively, a three-dimensional rendering and a perspective line drawing of another embodiment employing a chamfer. In some embodiments, the material for the free-masses was O1 Tool Steel having a RC-60 hardness. In various embodiments the hardness was selected to match the bit material.

Figure 4:
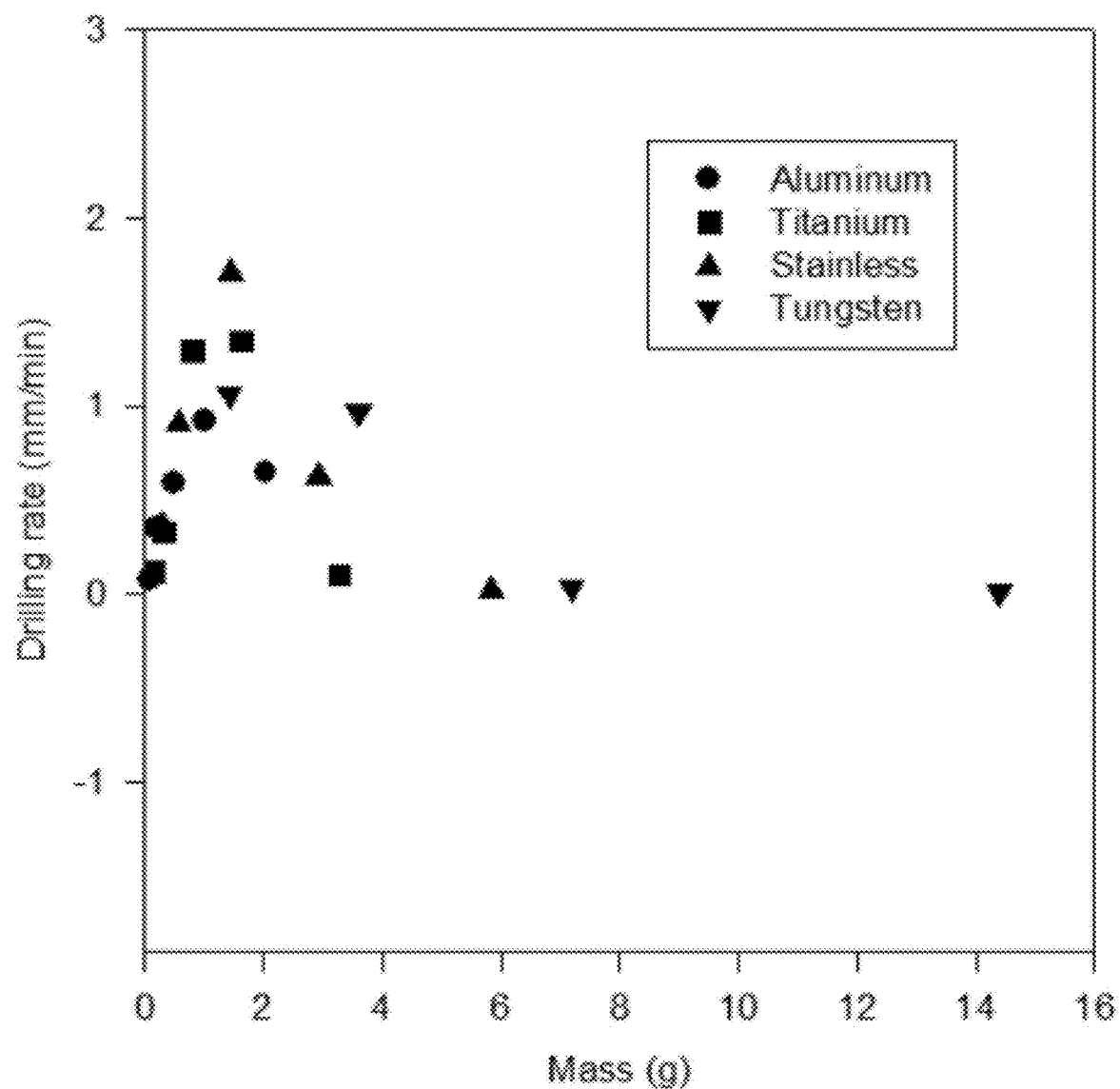
FIG. 4 is a plot showing the drilling rate into dolomite for an USDC employing a free-mass as a function of the mass and material of the free-mass.
Figure 5:
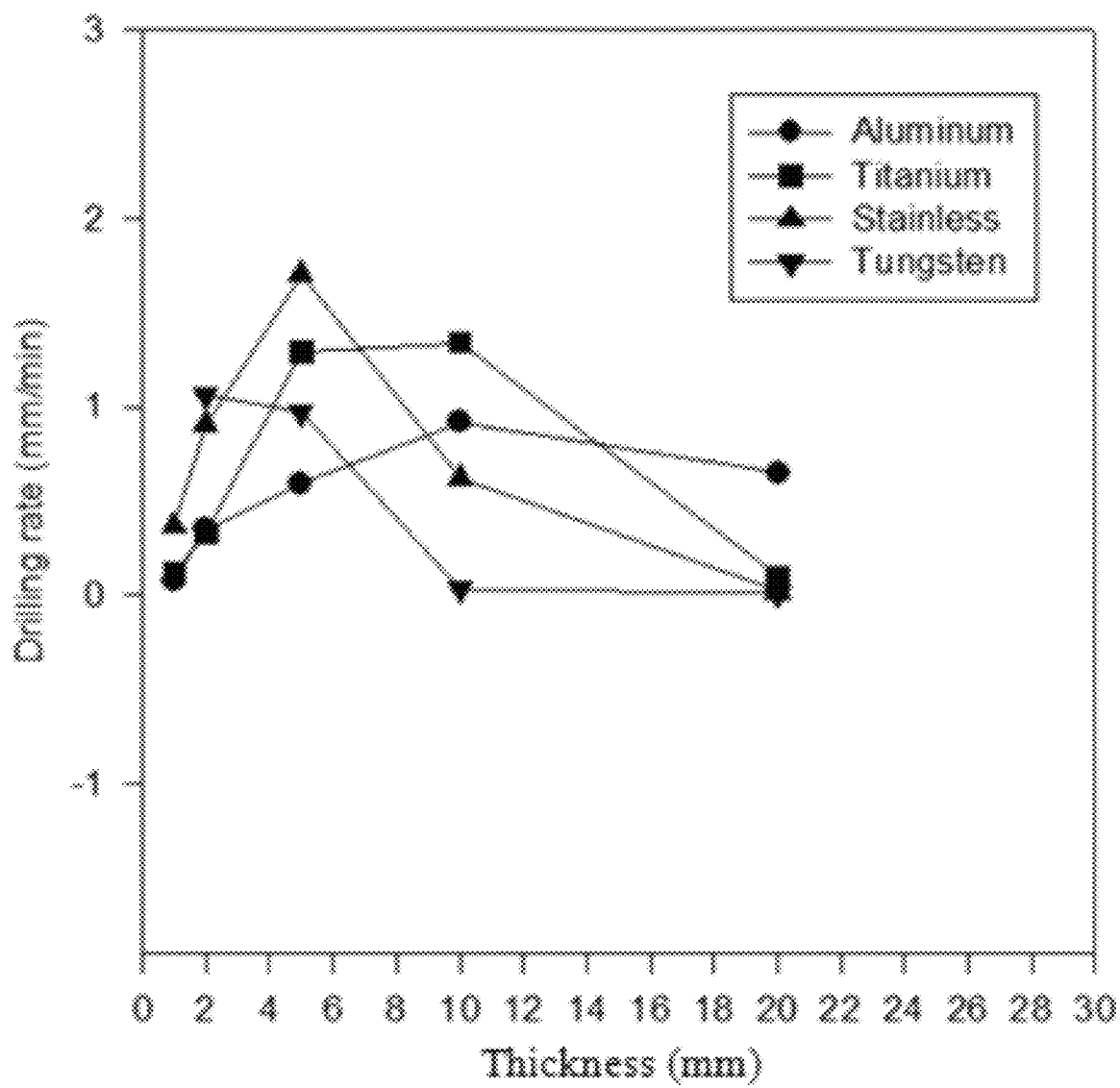
FIG. 5 is a plot showing the drilling rate into dolomite for an USDC employing a free-mass as a function of the thickness and material of the free-mass.

As part of determining the design parameters of free-mass configurations according to the invention, tests drilling into dolomite were made using different free-mass materials and thicknesses. As shown in FIGS. 4 and 5, the drilling rate for an USDC employing a free-mass depends on the characteristics of the free-mass. FIG. 4 shows the dependence of drilling rate for various free-mass materials and masses. For example as shown in FIG. 4 for the materials and masses tested, a free-mass made of stainless steel and having a mass of approximately 2 grams had the highest drilling rate, almost 2 mm per minute. FIG. 5 shows the dependence of drilling rate on free-mass material and thickness. For example as shown in FIG. 5 for the materials and thicknesses tested, a free-mass made of stainless steel and having a thickness of between 4 and 6 mm had the highest drilling rate, again almost 2 mm per minute. Also as shown in FIG. 5 as thickness increased, titanium and then aluminum was the material that achieved the highest drilling rate. Therefore, it is believed that judicious changes in material (e.g., density and hardness of the free-mass), mass of the free-mass, and thickness of the free-mass, as well as the shape of the free-mass can be selected to optimize the performance of a USDC based on the operational conditions that it is expected to encounter.

In one embodiment a design objective is to increase the stress at the rock bit interface by maximizing the stress amplitude at the horn/free-mass interface and the free-mass/bit interface while keeping it below the stress levels that cause plastic deformation. Some of the design variables can include the surface hardness (a high surface hardness can decrease impact time), the density (a high density can increase the momentum transfer within limits), the impact time (a small impact time can increase the stress amplitude), constraints in the two dimensional transverse motion combined, low friction free motion in the one dimensional axial direction (such motional constraints can focus energy into the bit), and keying of the free-mass and the bit so that the free-mass is unconstrained in the axial direction and provides hammering and rotation.

As discussed above according to the principles of the invention, designs for free-masses have been developed that have different configurations and different operational characteristics. In various embodiments, the geometry of the free-mass is varied. These different geometries result in different interface contact profiles for the free-mass with either the horn or the bit. In various embodiments, material and system parameters including the mass, stiffness, hardness, driving power, resonant frequency (of either the horn, free-mass and/ or bit), material composition and surface finish are varied to achieve the desired operational characteristics. In addition to the free-mass geometry, the material and system parameters also influence the contact profile between the free-mass and the horn or bit during impact.

Figure 6A:
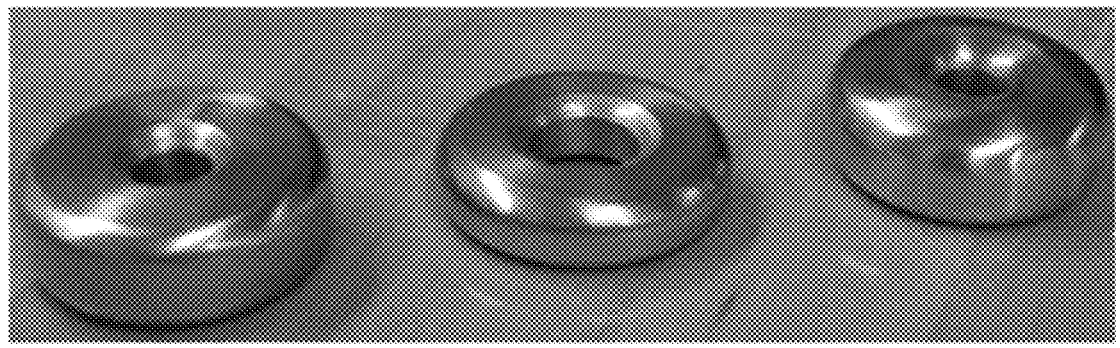
FIG. 6A shows a top view of three embodiments of free-masses having torodial geometries.
Figure 6B:
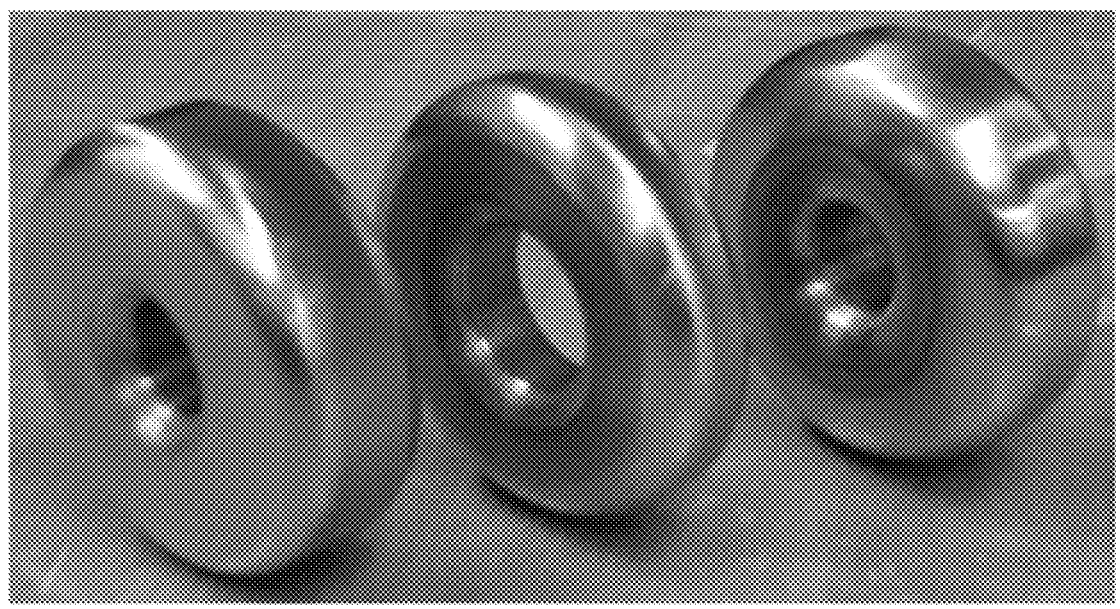
FIG. 6B shows a side view of three embodiments of free-masses having torodial geometries.

FIGS. 6A and 6B show, respectively, top and side views of three embodiments of free-masses having generally torodial geometries. In various embodiments, the curvature in the contact region in cross section is used to control the actual contact area during impacts. In one embodiment, the torodial designs shown in FIGS. 6A and 6B are implemented in a USDC that is used as a high temperature drill.

The geometry that can be used to characterize the different contact profiles can be used as a general classification system for some of the different free-mass embodiments.

According to principles of the invention, the contact profile for some embodiments can be characterized by shape and size. For example, the free-mass embodiment on the right in FIGS. 6A and 6B has a contact profile that can be characterized by a line.

Figure 7:
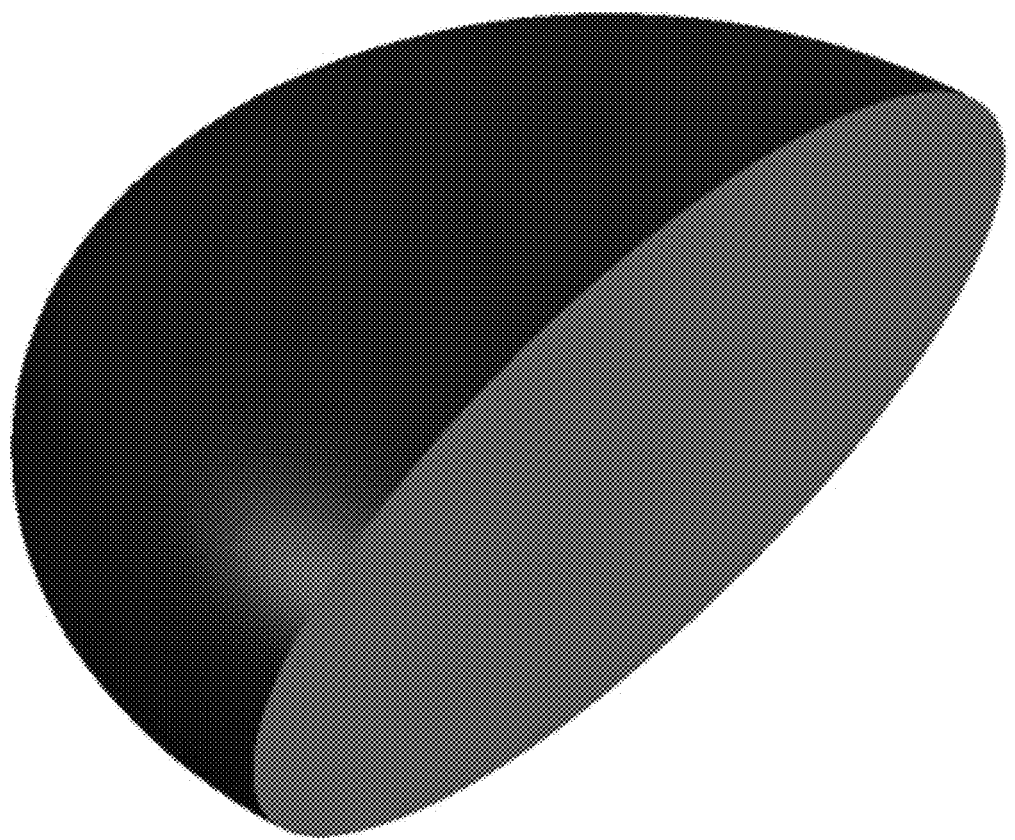
FIG. 7 shows a cross-section of a three dimensional rendering of an embodiment of a free-mass in which the contact profile can be characterized by a point.

According to the invention, the contact profile for some embodiments can be characterized by a point contact. In some embodiments spherical, elliptical or pill shapes are designed to assure that the impact locations at the top and bottom of the free-mass are points. FIG. 7 shows a cross-section of a three dimensional rendering of an embodiment of a free-mass in which the contact profile can be characterized by a point. Again, the surface curvature at the top and bottom can be used to control actual contact area during impacts. The shapes and sizes of the contact areas on the top and bottom surfaces of a free-mass can be individually controlled.

According to the principles of the invention, the contact profile for some embodiments can be characterized by a circular contact. In some embodiments spherical, elliptical or pill shapes with chapped parallel surfaces on the top and bottom correspond to circular contact surfaces with the horn and the bit.

According to the principles of the invention, the contact profile for some embodiments can be characterized by a point contact on one side and a circular contact on the other.

Figure 8A:
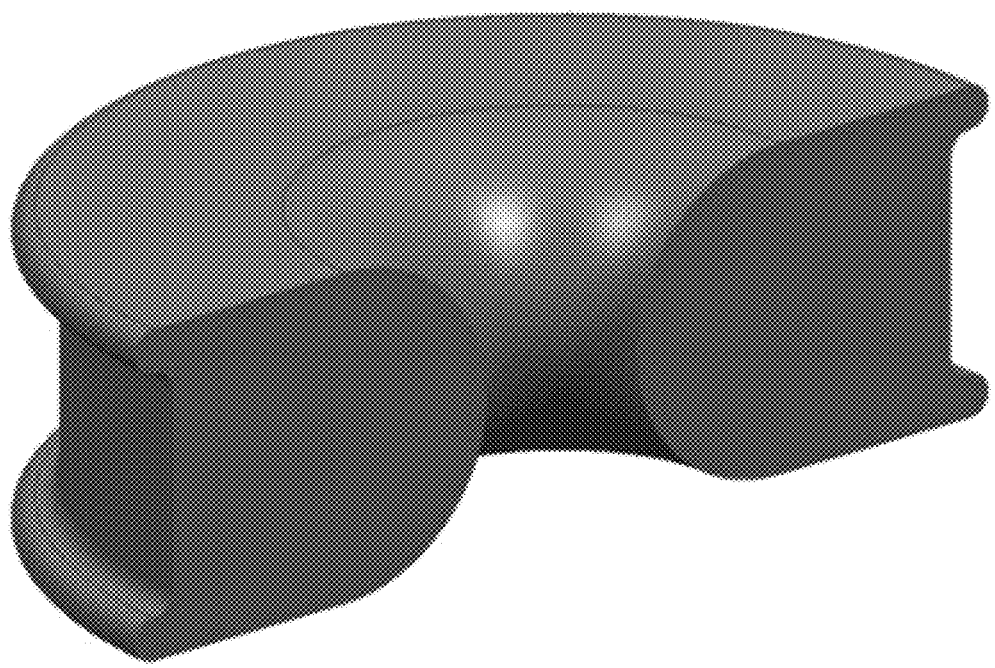
FIG. 8A is a cross-sectional view of a three-dimensional rendering of an embodiment of a free-mass with a wide interface area on the horn and the bit sides.
Figure 8B:
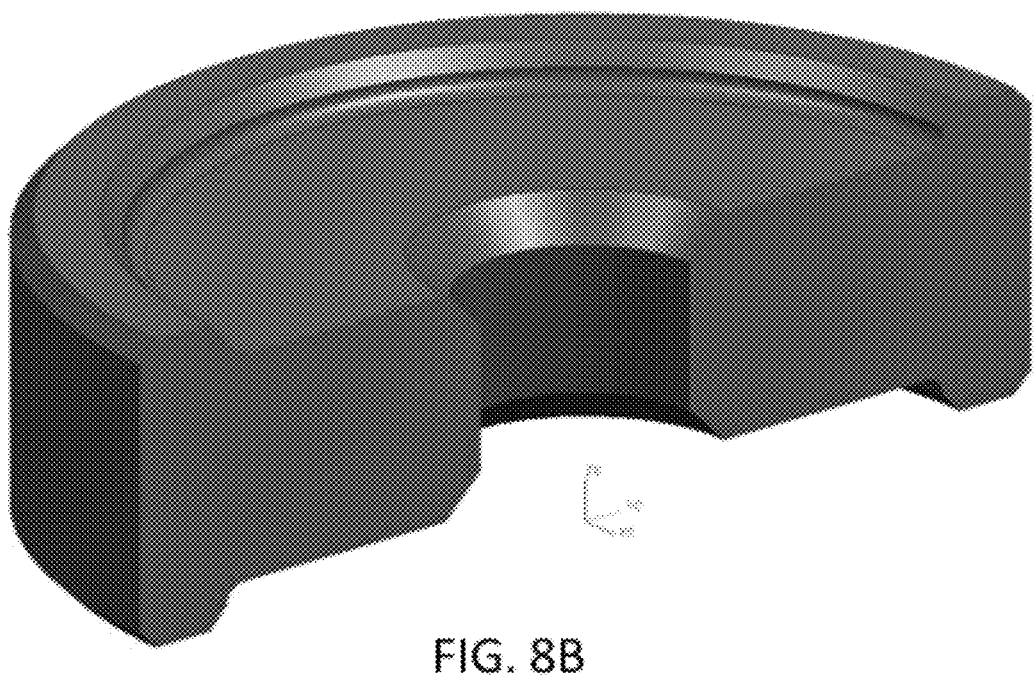
FIG. 8B is a cross-sectional view of a three-dimensional rendering of an embodiment of a free-mass with a narrow interface area on the horn and the bit sides.
Figure 9:
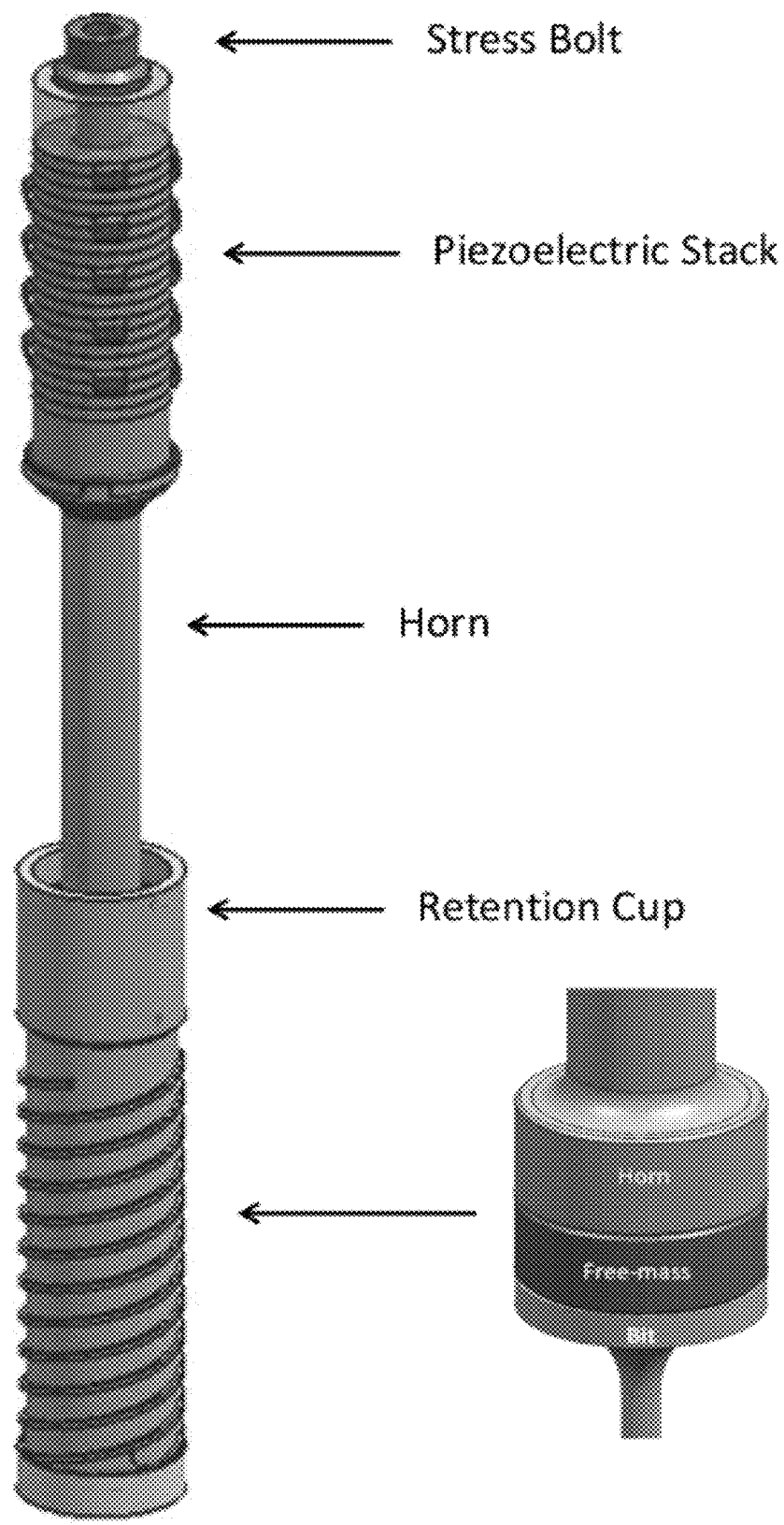
FIG. 9 is a three-dimensional rendering of an embodiment of a USDC with a free-mass.

According to principles of the invention, the contact profile for some embodiments can be characterized by a ring contact. FIGS. 8A and 8B are cross-sectional views of three-dimensional renderings of embodiments of free-masses with ring interface areas on the horn and the bit sides. The ring interface for FIG. 8A is wide whereas the interface for FIG. 8B is narrow. According to this embodiment, the ring interface area comprises the region between an inner circle and an outer circle. A three-dimensional rendering of an embodiment of a USDC with a free-mass is shown in FIG. 9. The USDC includes a stress bolt, a piezoelectric stack, a horn, and a retention cup. The right of FIG. 9 shows a detail of the horn, free-mass, and bit. In FIG. 9 the rendering of the USDC on the left hand side of the figure does not show the bottom of the horn, the free-mass or the bit as they are within the retention cup.

Figure 10:
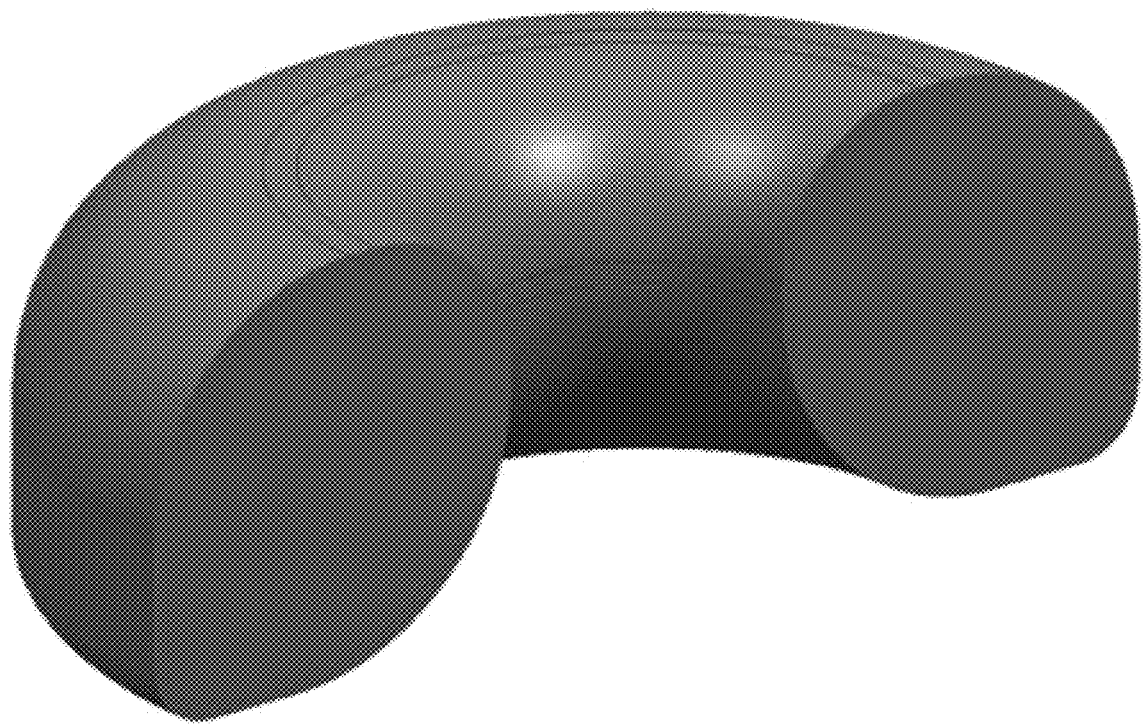
FIG. 10 is a cross-sectional view of a three-dimensional rendering of an embodiment of a free-mass with a line (wider) contact on one side and a ring (narrower) contact on the other.

According to the invention, the contact profile for some embodiments can be characterized by a line contact on one side and a ring contact on the other. A three dimensional rendering with a cross-sectional cut of one such embodiment is shown in FIG. 10.

According to the invention the line and ring embodiments described above can be as partial segments along the line or ring. For example, a line with partial segments can be characterized as a dashed line.

According to the invention in addition to the point/circular and line/ring contact profile combinations explicitly described above, the free-mass can be designed as a combination of any of the above shapes.

In some embodiments a heavier free-mass can be used thereby resulting in a lower rebound velocity and a lower frequency of impact. In one such embodiment, a heavier free-mass is used with softer materials. In other embodiments, the mass of the free-mass can be decreased thereby resulting in an increase in the impact frequency. In an embodiment used for rock crushing, the design constraints on choosing the mass include ensuring that the energy in the resonator and the momentum transferred during impact are adequate to produce failure of the workpiece (at least over repeated impacts) at the rock/bit interface.

Figure 11A:
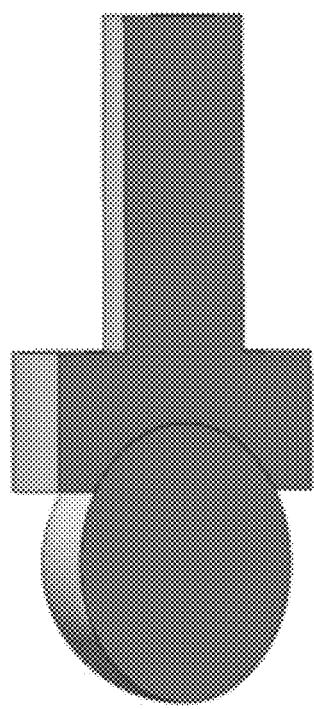
FIG. 11A shows a three-dimensional rendering of an integrated horn tip and free-mass embodiment that is designed to have a large contact interface.
Figure 11B:
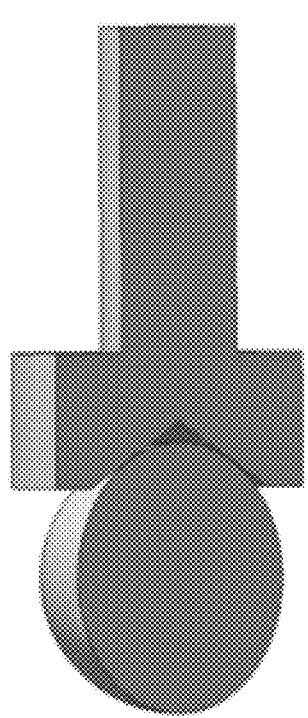
FIG. 11B shows a three-dimensional rendering of an integrated horn tip and free-mass embodiment that is designed to have a ring contact interface.
Figure 11C:
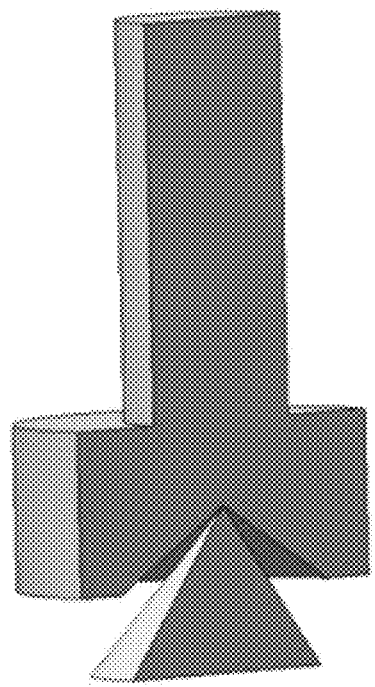
FIG. 11C shows a three-dimensional rendering of an integrated horn tip and free-mass embodiment that is designed to have a point contact interface.

According to the invention in addition to the free-mass contact profile, the contact geometry of the horn and/or the bit can be designed to achieve desired operational characteristics, such as increasing the stress pulse. FIG. 11A shows a three-dimensional rendering of an integrated horn tip and free-mass embodiment that is designed to have a large contact interface. FIG. 11B shows a three-dimensional rendering of an integrated horn tip and free-mass embodiment that is designed to have a ring contact interface. FIG. 11C shows a three-dimensional rendering of an integrated horn tip and free-mass embodiment that is designed to have a point contact interface. As indicated above, the bit/free-mass interface can be designed to have a particular contact interface according to the principles of the invention and the application that the UDSC is expected to provide.

Figure 12:
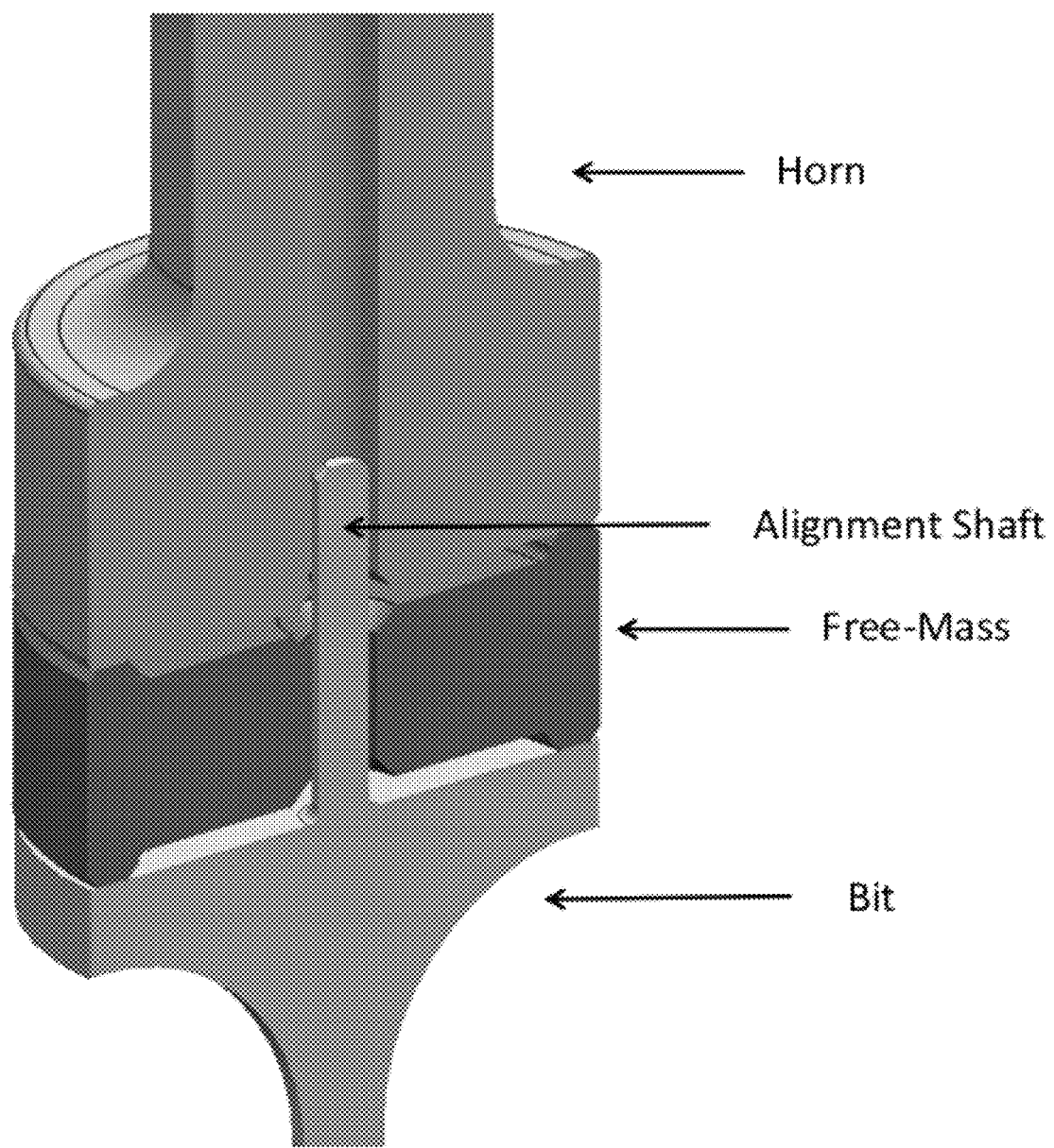
FIG. 12 is a cross-sectional view of a three-dimensional rendering of an embodiment in which the horn, the free-mass and the bit are aligned with respect to each other by means of a central shaft.

In one embodiment the horn, free-mass and bit are aligned with respect to each other by means of a central shaft. One such embodiment is shown in the cross-sectional view of a three-dimensional rendering in FIG. 12. As shown in FIG. 12, the bit includes a rod extending from its upper surface. The rod passes through a hole in the free-mass and into a channel in the horn. The rod acts as a shaft and provides guidance and alignment for the free-mass and the horn with respect to each other and the bit. In one particular embodiment, the free-mass has a diameter of 0.350 inch and a thickness chosen to meet the mass requirements of the particular implementation. In an alternative embodiment, the rod can be attached to the horn, and the bit can have a channel defined therein to accommodate the rod.

Figure 13:
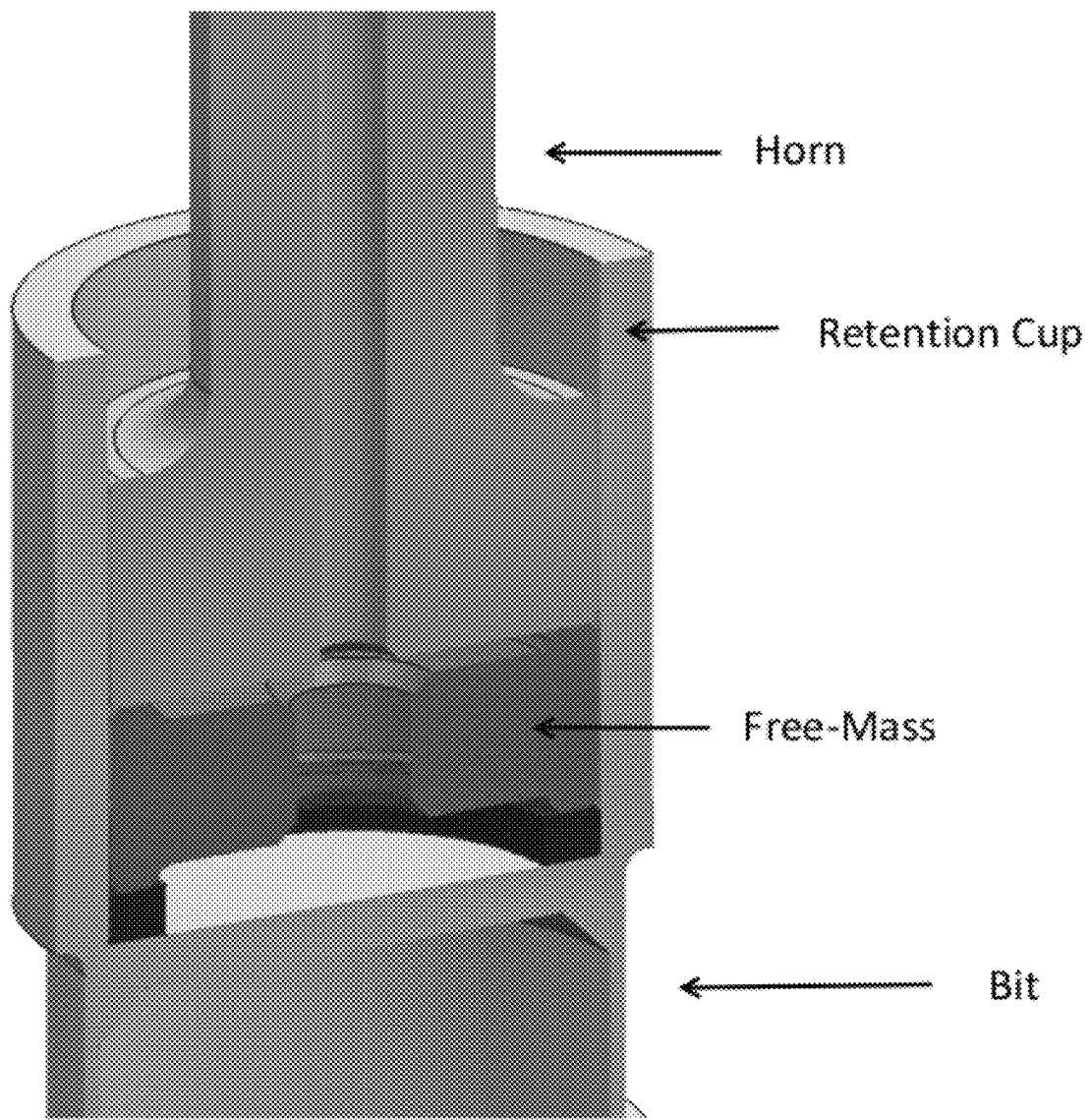
FIG. 13 is a cross-sectional view of a three-dimensional rending of an embodiment employing a retention cup for aligning the horn, the free-mass, and the bit with respect to each other.

In another embodiment, the rod shaft is removed and the horn, free-mass, and bit are aligned with respect to each other using a hollow cylinder. The hollow cylinder functions as a retention cup. FIG. 13 shows a cross-sectional view of a three-dimensional rending of an embodiment employing a retention cup for aligning the horn, free-mass, and bit with respect to each other. The disk below the free-mass in the retention cup is a hardened material that takes the impact from the free-mass and distributes it to the bit. In some embodiments, the design of the free-mass and the alignment method used can improve the durability of the bit.

Depending on the ratio of the diameter to the height, and the free-mass retention method used (the cup or rod), the free-mass can be configured with one or more sliding surfaces on the outside or inside diameter surface or both. If a cup is used for alignment, the free-mass need not have a central aperture defined therein. In some embodiments, both a rod and a cup can be provided for alignment.

Figure 14A:
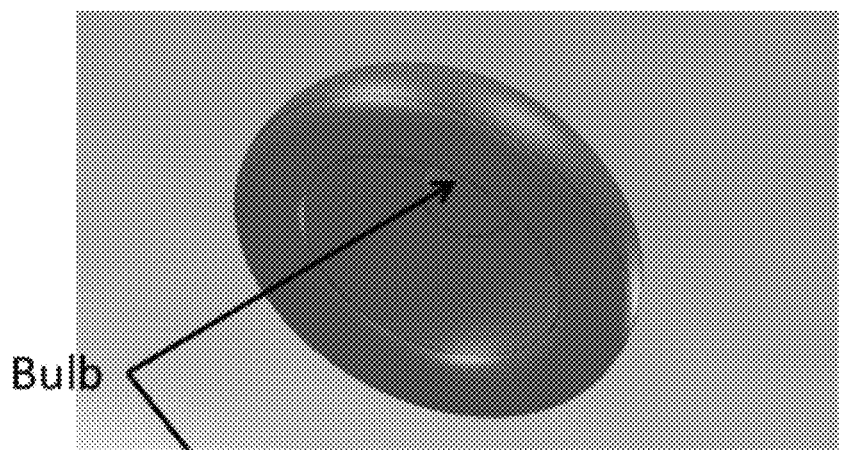
FIG. 14A is a perspective view of a three-dimensional rendering of a free mass capable of having a tunable resonant frequency.
Figure 14B:
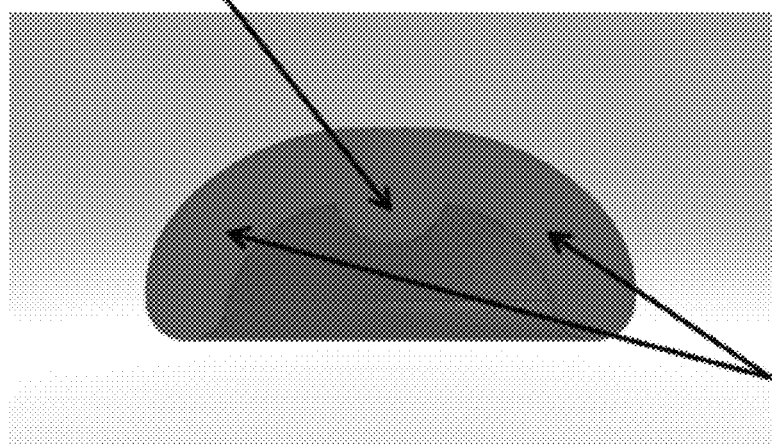
FIG. 14B is a cross-sectional view of a three-dimensional rendering of the free-mass shown in FIG. 14A.
Figure 14C:
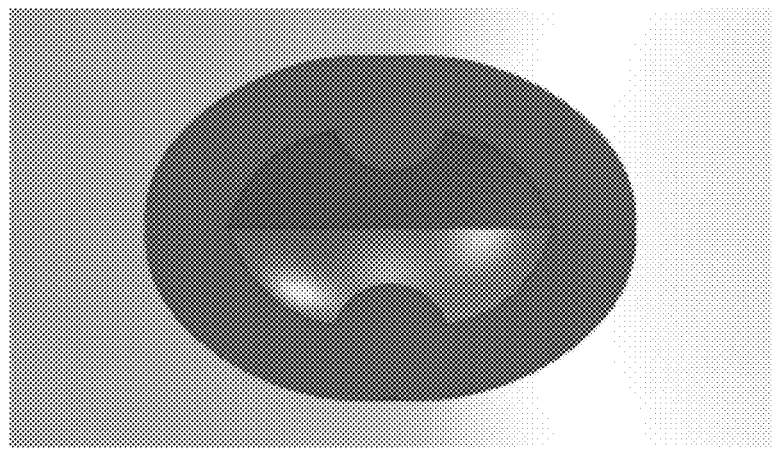
FIG. 14C is a cross-sectional view of a three-dimensional rendering of an embodiment of a resonant frequency tunable free-mass in which two of the hemispheres show in FIGS. 14A and 14B are joined together.

In some embodiments, the free-mass is designed to have a particular resonant frequency. In one embodiment, the resonant frequency of the free-mass is different from the horn resonant frequency and the bit impact frequency. An advantage of this embodiment is that it can decrease the likelihood of the free-mass binding in the restraining system and/or ceasing to oscillate between the horn and the bit. In addition to other benefits, the movement associated with a resonating free-mass helps to prevent it from becoming jammed FIG. 14A shows a perspective view of a three-dimensional rendering of a free mass capable of having a tunable resonant frequency. FIG. 14B shows a cross-sectional view of a three-dimensional rendering of the free-mass shown in FIG. 14A. The free-mass includes a bulb portion, near the top of the hemisphere, whose size and shape can be changed to adjust the mass of the free-mass. Changes to the mass of the bulb can be achieved without significant overall changes to the geometry of the free-mass. The thickness of walls of the free-mass can be changed as a function of distance along the axial dimension of the free-mass so as to change the effective stiffness constant of the free-mass. As the resonant frequency of an object is most strongly affected to first order by changes in its mass and stiffness, the embodiment described above allows for the tuning of the resonant frequency of the free-mass. FIG. 14C shows an embodiment of a resonant frequency tunable free-mass in which two of the hemispheres shown in FIGS. 14A and 14B are joined together. As is known in the art, this joining can be achieved by employing a variety of methods including welding or bolting.

Figure 15:
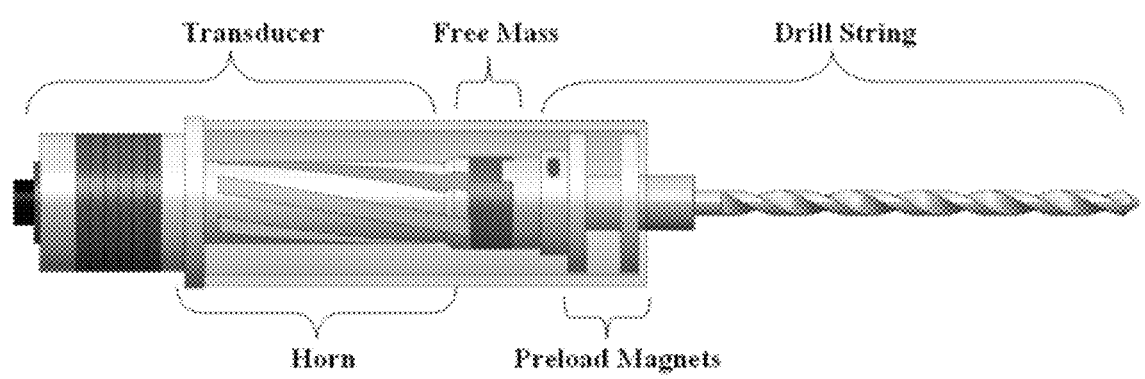
FIG. 15 is a three-dimensional rendering of an embodiment of a rotary hammering drill employing a keyed free-mass.

In some embodiments, the free-mass is employed in a rotary hammering drill. One embodiment of a rotary drill is shown in FIG. 15. The rotary hammering drill includes a transducer portion, a free mass portion, and a drill string portion. The transducer portion includes a horn designed for translating linear motion into rotary motion. In one embodiment as shown in FIG. 15, the free-mass has a key slot cut to fit a corresponding ridge in the drill string.

In one embodiment, the horn with angled cuts is designed to extend in such a way at resonance so as to transmit both linear and rotary momentum to the free mass upon impact. Due to the angled cuts in the horn, the horn tip will tend to rotate as it extends. The torque induced by the cuts in the horn is similar to the effect of an impact driver. Torque will be transferred from the horn tip to the free mass through friction at impact. When the horn tip retracts and rotates in the opposite direction, the horn tip and free mass will not be in contact. Thus, a net positive rotation is induced on the free mass. The cut keyway in the free mass allows efficient torque transfer between it and the rest of the drill string.

In one embodiment repelling magnets are used instead of a spring to preload the drill string and free mass against the horn. Magnets reduce friction that may be caused by a spring due to the rotation of the drill string.

Additional details pertaining to rotary hammering drills are found in co-pending U.S. patent application Ser. No. 12/877,390 filed Sep. 8, 2010.

Some embodiments of the invention have been implemented in a USDC capable of operating at temperatures as high as 500° C. In some embodiments, asymmetric grooves are introduced into the bit to induce rotation of the bit.

In one embodiment of the present invention, fabrication of the free-masses is achieved with precision machining. In another embodiment, fabrication is achieved with electron beam melting (EBM). In other embodiments, other rapid prototyping techniques are employed. In additional embodiments, fabrication is achieved using such low cost high production techniques as investment casting. In further embodiments, such as large scale production, standard casting can be employed.

In addition to a USDC, applications for the use of a free-mass of the present invention include but are not limited to structurally integrated motors, rotary hammering drills, ultrasonic rock crushing, ultrasonic levitation, industrial applications such as cutting and welding, medical applications including surgical tools, lithotripsy, knifes, and drills, space applications including corers, drills, abrasion tools and powder samplers, and testing equipment such as wearing testing and fatigue testing.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A free-mass,
   said free-mass having a geometry configured to receive momentum from a horn portion of an ultrasonic percussive device when present in said ultrasonic percussive device and to transmit momentum to a bit portion of said ultrasonic percussive device when present in said ultrasonic percussive device without exceeding stress and material deformation parameters of said bit portion, said free-mass or said horn portion,
   said free-mass having a geometry comprising at least one of a rounded profile and a chamfer configured to reduce jamming of said free-mass when present in said ultrasonic percussive device as it moves from a position of contact with one of said horn portion and said bit portion to a position of contact with the other of said horn portion and said bit portion.

2. The free-mass of claim 1 wherein said geometry of said free-mass has a toroidal shape.

3. The free-mass of claim 1 having a contact profile chosen from the group consisting of a point contact, a circular contact, a line contact, a ring contact, a dashed line contact, a dashed ring contact, and combinations thereof.

4. The free-mass of claim 3 wherein a contact profile of said free-mass configured to contact said horn portion is different from a contact profile of said free-mass configured to contact said bit portion.

5. The free-mass of claim 1 wherein said free-mass is configured to maximize a stress amplitude at at least one of a first interface between said horn portion and said free-mass and a second interface between said free-mass and said bit portion without exceeding stress and material deformation parameters of said bit portion, said free-mass or said horn portion.

6. The free-mass of claim 5 wherein said free-mass has a material property chosen from at least one of a stiffness, a hardness and a density.

7. The free-mass of claim 1 wherein said free-mass has a mass configured to receive momentum from said horn portion and to transmit momentum to said bit portion without exceeding stress and material deformation parameters of said bit portion, said free-mass or said horn portion.

8. The free-mass of claim 1 wherein said geometry of said free-mass is configurable to control a resonant frequency of said free-mass.

9. The free-mass of claim 1 wherein said geometry of said free-mass is configurable to maximize impact momentum transferred from said horn portion to said bit portion.

10. The free-mass of claim 1 wherein said geometry of said free-mass is configurable to reduce the jamming of said free-mass to a minimum.

11. The free-mass of claim 1 wherein said free-mass has a thickness configured to receive momentum from said horn portion and to transmit momentum to said bit portion without exceeding stress and material deformation parameters of said bit portion, said free-mass or said horn portion.

12. The free-mass ultrasonic percussive drilling/coring system of claim 1 wherein said free-mass has a first resonant frequency, said horn portion has a second resonant frequency, and said bit portion has a third resonant frequency, said first resonant frequency being different from said second resonant frequency and said third resonant frequency.

13. The free-mass of claim 1 wherein said free-mass is constrained in a transverse direction and is free to move in an axial direction.

14. The free-mass of claim 1, in combination with:
   a horn portion of an ultrasonic percussive device configured to receive ultrasonic energy from an actuator material, said actuator material configured to receive power from a power supply; and
   a bit portion of said ultrasonic percussive device in mechanical communication with said horn portion.

* * * * *